(12) United States Patent
Throop et al.

(10) Patent No.: US 9,542,326 B1
(45) Date of Patent: *Jan. 10, 2017

(54) MANAGING TIERING IN CACHE-BASED SYSTEMS

(75) Inventors: Dean D. Throop, Efland, NC (US); Dennis T. Duprey, Raleigh, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 257 days.

This patent is subject to a terminal disclaimer.

(21) Appl. No.: 13/159,780

(22) Filed: Jun. 14, 2011

(51) Int. Cl.
*G06F 12/00* (2006.01)
*G06F 13/00* (2006.01)
*G06F 13/28* (2006.01)
*G06F 12/08* (2016.01)

(52) U.S. Cl.
CPC ................................. *G06F 12/0866* (2013.01)

(58) Field of Classification Search
CPC .............. G06F 11/1458; G06F 11/2092; G06F 17/2236; G06F 12/6875
USPC .......................................................... 711/117
See application file for complete search history.

(56) References Cited

U.S. PATENT DOCUMENTS

| | | | | |
|---|---|---|---|---|
| 7,124,272 B1* | 10/2006 | Kennedy | ............... | G06F 3/0613 711/173 |
| 7,949,637 B1* | 5/2011 | Burke | ........................... | 707/655 |
| 8,380,928 B1* | 2/2013 | Chen | ....................... | G06F 3/061 711/117 |
| 8,429,346 B1* | 4/2013 | Chen | ..................... | G06F 3/0689 709/213 |
| 8,443,157 B1* | 5/2013 | Reiner | .................. | G06F 3/0605 711/154 |
| 8,473,678 B1* | 6/2013 | Rajasekaran | ......... | G06F 3/0605 711/114 |
| 8,478,731 B1* | 7/2013 | Throop | ............. | G06F 17/30153 707/693 |
| 8,510,528 B2* | 8/2013 | Rubio et al. | ................... | 711/165 |
| 9,330,009 B1* | 5/2016 | Throop | ............... | G06F 12/0866 |
| 2004/0230764 A1* | 11/2004 | Merchant | .............. | G06F 3/0608 711/173 |
| 2009/0113112 A1* | 4/2009 | Ye | ....................... | G06F 12/0246 711/102 |
| 2009/0150593 A1* | 6/2009 | Hamilton | ................ | G06F 3/061 711/101 |
| 2010/0281230 A1* | 11/2010 | Rabii | .................... | G06F 3/0605 711/165 |

(Continued)

*Primary Examiner* — Sheng-Jen Tsai
(74) *Attorney, Agent, or Firm* — Krishnendu Gupta; Jason A. Reyes

(57) ABSTRACT

A method and a system for use in managing tiering in a cache-based system is disclosed wherein the cache-based system comprises a first data storage tier and a second data storage tier configured such that the performance characteristics associated with one of the tiers is superior to the performance characteristics associated with the other tier. In at least one embodiment the method and system comprises collecting a first set of I/O activity data for at least one data unit located in a cache, wherein the at least one data unit is associated with a data group located on the first data storage tier; collecting a second set of I/O activity data for the data group located on the first data storage tier; analyzing the first and second set of I/O activity data; and based on the analysis and the performance characteristics associated with the second data storage tier, determining whether the data group should be migrated to the second data storage tier.

18 Claims, 4 Drawing Sheets

(56) References Cited

U.S. PATENT DOCUMENTS

| | | | |
|---|---|---|---|
| 2011/0035548 A1* | 2/2011 | Kimmel | G06F 3/061 711/114 |
| 2011/0106862 A1* | 5/2011 | Mamidi | G06F 17/30221 707/823 |
| 2011/0106863 A1* | 5/2011 | Mamidi | G06F 17/30221 707/823 |
| 2011/0167217 A1* | 7/2011 | Montgomery | G06F 3/0613 711/114 |
| 2011/0202732 A1* | 8/2011 | Montgomery | G06F 3/061 711/154 |
| 2012/0036327 A1* | 2/2012 | Jennas, II | G06F 3/0613 711/137 |
| 2012/0173831 A1* | 7/2012 | Rubio | G06F 3/0605 711/165 |
| 2012/0239859 A1* | 9/2012 | Lary | G06F 3/061 711/103 |
| 2012/0296883 A1* | 11/2012 | Ganesh | G06F 17/30315 707/693 |
| 2012/0317337 A1* | 12/2012 | Johar | G06F 12/0246 711/103 |
| 2013/0173856 A1* | 7/2013 | Ye | G06F 12/0246 711/103 |

* cited by examiner

MANAGING TIERING IN CACHE-BASED SYSTEMS

FIELD OF THE INVENTION

This application relates to managing tiering in cache-based systems.

BACKGROUND

A traditional storage array (herein also referred to as a "disk storage array", "disk array", or simply "array") is a collection of hard disk drives operating together logically as a unified storage device. Storage arrays are designed to store large quantities of data. Storage arrays typically include one or more storage array processors (SPs), for handling both requests for allocation and input/output (I/O) requests. An SP is the controller for and primary interface to the storage array.

Performance of a storage array may be characterized by the array's total capacity, response time, and throughput. The capacity of a storage array is the maximum total amount of data that can be stored on the array. The response time of an array is the amount of time that it takes to read data from or write data to the array. The throughput of an array is a measure of the amount of data that can be transferred into or out of (i.e., written to or read from) the array over a given period of time.

The administrator of a storage array may desire to operate the array in a manner that maximizes throughput and minimizes response time. In general, performance of a storage array may be constrained by both physical and temporal constraints. Examples of physical constraints include bus occupancy and availability, excessive disk arm movement, and uneven distribution of load across disks. Examples of temporal constraints include bus bandwidth, bus speed, spindle rotational speed, serial versus parallel access to multiple read/write heads, and the size of data transfer buffers.

One factor that may limit the performance of a storage array is the performance of each individual storage component. For example, the read access time of a disk storage array is constrained by the access time of the disk drive from which the data is being read. Read access time may be affected by physical characteristics of the disk drive, such as the number of revolutions per minute of the spindle: the faster the spin, the less time it takes for the sector being read to come around to the read/write head. The placement of the data on the platter also affects access time, because it takes time for the arm to move to, detect, and properly orient itself over the proper track (or cylinder, for multihead/multiplatter drives). Reducing the read/write arm swing reduces the access time. Finally, the type of drive interface may have a significant impact on overall disk array storage. For example, a multihead drive that supports reads or writes on all heads in parallel will have a much greater throughput than a multihead drive that allows only one head at a time to read or write data.

Furthermore, even if a disk storage array uses the fastest disks available, the performance of the array may be unnecessarily limited if only one of those disks may be accessed at a time. In other words, performance of a storage array, whether it is an array of disks, tapes, flash drives, or other storage entities, may also be limited by system constraints, such as the number of data transfer buses available in the system and the density of traffic on each bus.

Storage arrays are typically used to provide storage space for one or more computer file systems, databases, applications, and the like. For this and other reasons, it is common for storage arrays to be logically partitioned into chunks of storage space, called logical units, or LUs. This allows a unified storage array to appear as a collection of separate file systems, network drives, and/or Logical Units.

The Storage Array keeps track of the logical unit to physical unit association in a map. The map associates a host logical unit address with a physical device address. The size of the elements in the map is the coarseness of the map. A map that only has a few entries of large extents is a course grain map. A map that has many entries with small extents is a fine grain map. Fine grain map allow more flexibility but generally are too large for all of it to be contained in memory at once. It is possible to use different mapping granularities for different data to achieve a variety of space/performance trade offs.

One way to improve storage array performance is by using a cache. A cache may be used to temporarily store data that is frequently accessed. As known in the art, a cache may be implemented using fast storage media such as RAM (random access memory), dynamic RAM (DRAM), FLASH memory or FLASH drives. If requested data is contained in the cache, the request can be satisfied by reading from the cache instead of from the slower original storage location of the data.

A further way to improve the storage array performance is by tiering where data is stored on various types of storage devices, based on performance, availability and recovery requirements.

SUMMARY OF THE INVENTION

A method and system for use in managing tiering in a cache-based system is disclosed wherein the cache-based system comprises a first data storage tier and a second data storage tier configured such that the performance characteristics associated with one of the tiers is superior to the performance characteristics associated with the other tier. In at least one embodiment the method and system comprises collecting a first set of I/O activity data for at least one data unit located in a cache, wherein the at least one data unit is associated with a data group located on the first data storage tier; collecting a second set of I/O activity data for the data group located on the first data storage tier; analyzing the first and second set of I/O activity data; and based on the analysis and the performance characteristics associated with the second data storage tier, determining whether the data group should be migrated to the second data storage tier.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

Described below is a technique for use in managing tiering in cache-based systems. In some embodiments in accordance with the current technique, a determination to migrate a data group to storage devices grouped together based on performance characteristics may be made based on cache and non-cache access activity data associated with the data group. Grouping storage devices together based on performance characteristics and migrated data groups based on cache and non-cache access activity may help provide better system performance and a lower cost of ownership.

Figure 1:
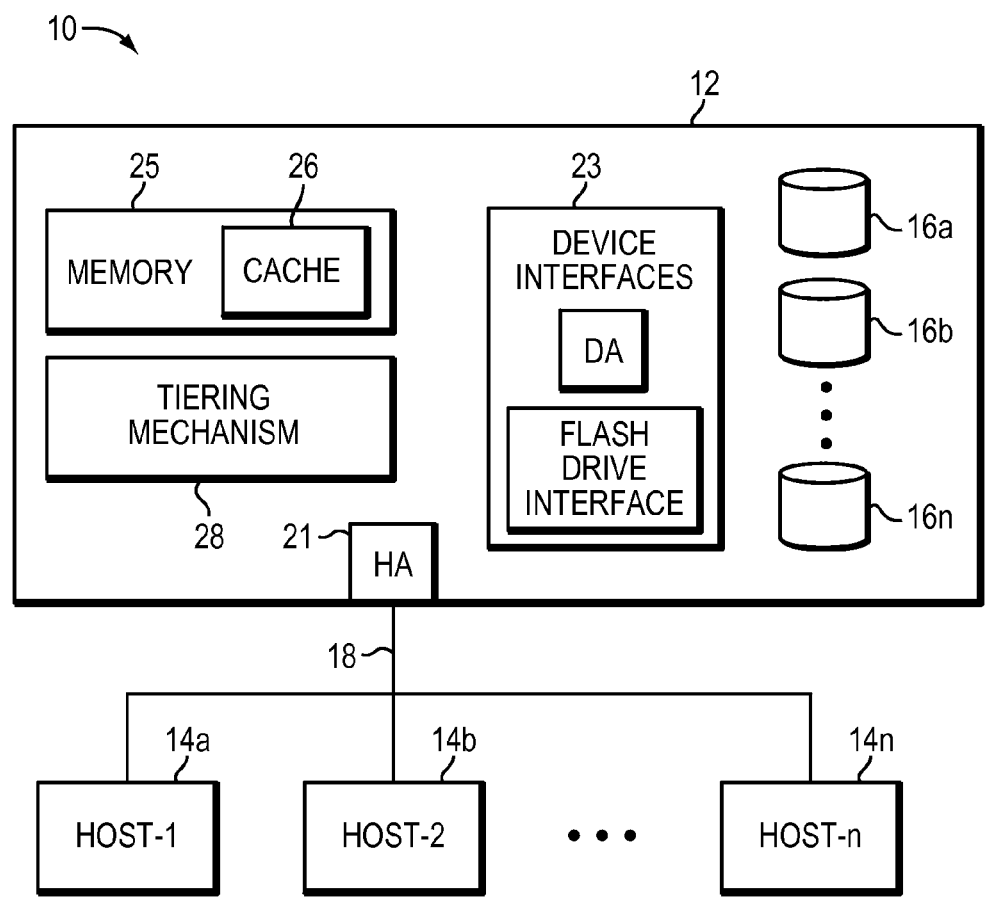
FIG. 1 is an example embodiment of a system that may utilize the techniques described herein.

Referring to FIG. 1, shown is an example of an embodiment of a system that may be used in connection with performing one or more implementations of the current techniques described herein. The system 10 includes a data storage system 12 connected to host systems 14a-14n through communication medium 18. In this embodiment of the computer system 10, the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. The communication medium that may be used to provide the different types of connections between the host computer systems and the data storage system of the system 10 may use a variety of different communication protocols such as SCSI, Fibre Channel, iSCSI, and the like. Some or all of the connections by which the hosts and data storage system may be connected to the communication medium may pass through other communication devices, such as a Connectrix or other switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not need to address the drives or devices 16a-16n of the storage systems directly, but rather access to data may be provided to one or more host systems from what the host systems view as a plurality of logical devices or logical units (LU). The LUs may or may not correspond to the actual physical devices or drives 16a-16n. For example, one or more LUs may reside on a single physical drive or multiple drives, or a variety of subsets of multiple drives. Data in a single data storage system, such as a single data storage array, may be accessed by multiple hosts allowing the hosts to share the data residing therein. The map kept by the storage array may associate host system logical address with physical device address.

The data storage system 12 in the embodiment of FIG. 1 further comprises a host adaptor (HA) 21 coupled to the hosts 14a-14n via the communication medium 18, device interfaces 23, memory 25, cache 26, and tiering mechanism 28. The device interfaces 23 may comprise device adaptors and interfaces (e.g., a flash drive interface). Additionally, the cache 26 may be connectable to the device interfaces 23 if the cache utilizes flash drives in addition to memory.

As described above, the data storage system 12 may be a data storage array including a plurality of data storage devices 16a-16n in which one or more of the devices 16a-16n are flash memory devices employing one or more different flash memory technologies. In one embodiment, the data storage system 12 may be a Symmetrix® DMX™ data storage array and/or a CLARiiON® data storage array by EMC Corporation of Hopkinton, Mass. In the foregoing data storage array, the data storage devices 16a-16n may include a combination of disk devices and flash devices in which the flash devices may appear as standard Fibre Channel (FC) drives to the various software tools used in connection with the data storage array. The disk devices may be any one or more different types of disk devices such as, for example, an ATA disk drive, FC disk drive, and the like. The flash devices may be constructed using different types of memory technologies such as nonvolatile semiconductor NAND flash memory forming one or more SLC (single level cell) devices and/or MLC (multi level cell) devices. Additionally, flash memory devices and disk devices are two exemplary types of devices that may be included in a data storage system used in connection with the techniques described herein.

Thus, the storage system may include a variety of storage devices with different physical and performance characteristics (e.g., types of storage devices, disk speed such as in RPMs), RAID levels and configurations, different replication services (such as particular software used in the data storage system providing data replication), allocation of cache, and processors used to service an I/O request. In accordance with an embodiment of the current technique, storage devices with the same or similar characteristics may be grouped into two or more tiers. For example, a group of solid state drives may comprise a fastest tier, a group of fast but small disks may comprise a fast tier, and a group of slow but large disks may comprise a slow tier. It should be noted that in addition to a storage tier, there may be a construct referred to as a storage pool. A storage pool ("pool") may be a reserve of storage devices that may be used, for example, to create LUs, as needed. A pool, as in the case of a storage tier, may be made up of devices with different performance and cost characteristics. Thus, devices within a pool may be grouped into two or more tiers. In some embodiments, each pool may itself represent a tier. In this embodiment, a pool may be made up of only storage devices with the same or similar characteristics.

In some embodiments, it may also be possible to bind or designate a set of data storage resources, such as logical and/or physical devices, a portion of cache 26, and services, such as a software vendor's service for providing data replication, to one or more of the tiers. The set of resources associated with or designated for use by a tier or grouping within a pool may be characterized as a dynamic binding in that the particular set of data storage system resources associated with a tier may vary from time to time. Also, the configuration for the data storage system, aspects of the current data storage system resources (e.g., types of devices, device storage capacity and physical device characteristics related to speed and time to access data stored on the device), and current workload and other dynamic aspects (e.g., actual observed performance and utilization metrics) of the data storage system, may also change over time.

In an embodiment of the current technique, data storage systems that comprise storage devices of varied performance characteristics grouped into tiers can be managed in such a way as to emulate a storage system comprising only the fastest performing devices. A particular embodiment may help achieve this emulation by automatically migrating data among the tiers based on the "temperature" of the data. In general, temperature may correspond to, for example, how often and how recently the data is accessed. For example, hot data may refer to data that has been accessed recently and is accessed often, and cold data may refer to data that has not been accessed recently and is not accessed often. In general, in accordance with an embodiment of the current technique, hot data is migrated to faster (and typically more expensive) storage and cool data is migrated to slower (and typically less expensive) storage. Migrating the hottest, most accessed, data to fastest storage and the coldest, least accessed, data to less expensive storage may help provide better system performance and an improved total cost of ownership (TCO). By using a variety of different devices the storage array can have a performance profile more like an array having only fast disks with a cost profile approaching an array having only slow disks without customers having to expend time to catagorize and manage tiers of storage. Data of a fine granularity can be moved, or migrated, to the appropriate tier or pool using a rather limited set of resources.

Figure 2:
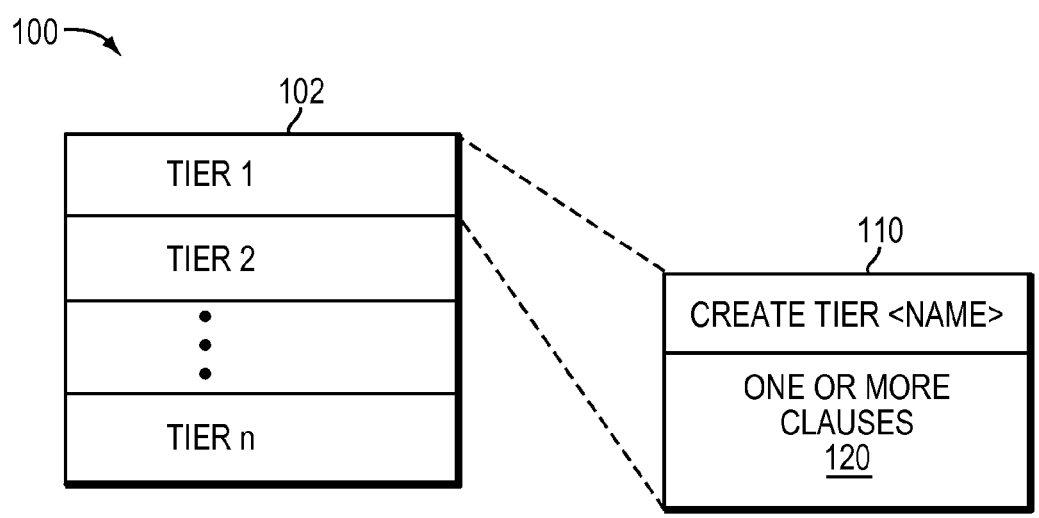
FIG. 2 is an example embodiment of storage tiering.

Referring to FIG. 2, shown is an example embodiment illustrating tiers. The example 100 includes a set of one or more tiers 102. Each tier, such as tier 1, may be created by specifying a tier definition 110. In at least one embodiment, the tier definition 110 may include one or more lines of text in a language which may be subsequently processed by code on the data storage system. The tier definition 110 defines a tier indicated by <NAME>. The tier definition may include one or more clauses 120. The clauses of 120 may include one or more goal clauses and/or one or more configuration clauses that represent tiering policies.

In some embodiments, data may be migrated among the tiers in "slices." A slice, for example, may be a logical grouping of data of a particular size, e.g., a one gigabyte slice of data. A slice may correspond to a LU. A slice may be comprised of smaller data units, or slivers, which may be, for example, an eight kilobyte sliver (or page). Embodiments of the current technique may enable the migration of both slices and slivers.

As described above, the temperature of data is determined by analyzing how often that data is accessed, e.g., I/O access data statistics. For example, the temperature may be given by considering the number of times a particular slice of data is accessed in a given second or it may correspond to the response time of the accesses to the data. Some embodiments may collect data only during time periods that are of particular interest, which may be determined based on host or storage system behavior. In some embodiments, data temperature may be determined by taking the average of the calculated temperatures over a given period of time or may be calculated using exponential decay. In at least one embodiment, the temperature of a slice may be designated as a scalar or step value, that is it may have a numerical equivalent such as 30 degrees or may simply be designated into a category, such as cold or hot. The temperature may also be relative. For example, slice temperature may be determined by comparing the access statistics for a slice in a tier to access statistics of other slices in the same tier.

In a specific embodiment, the tiering mechanism 28 may maintain information regarding to which tier a slice or sliver is associated and may also track and store access statistics for slivers and slices to determine a temperature of the slices. In at least one embodiment, the temperature for a given slice may be based on I/O activity associated with the slivers of that slice. Depending on the slice temperature, the slice may be a candidate for migration to a faster or slower tier by the tiering mechanism 28.

In some cases, slivers of a slice may be located in cache 26. Conventionally, access statistics (e.g., I/O activity data) associated with the cached slivers are not considered when calculating the temperature of the slice corresponding to the slivers. Consequently, the temperature of the slice may be distorted. For example, if cache 26 is handling a lot of I/O activity for slivers of a slice, the slice may appear colder than it would if the slivers were not being accessed from the cache.

In some embodiments in accordance with the current technique, the tiering mechanism 28 may consider access statistics associated with slivers of a slice located in cache 26. In these embodiments, cache 26, or another component such as tiering mechanism 28, may track and store access statistics for the cached slivers. The tiering mechanism 28 may then combine cached sliver statistics and the non-cached sliver statistics to determine whether a slice should be migrated to a faster tier. Thus, the current technique may help provide a more accurate slice temperature by coordinating cache and tier activity. In some embodiments, the current technique may also help free up space in cache 26 as the slivers may no longer be cached once the slice is migrated to a faster tier.

In at least some embodiments, the scheduled time to migrate a slice of data to a different tier may be used as a time to perform several actions on the data. For example, storage pools may be expanded and data re-distributed across the new pools; the data may be re-sequenced for sequential access; or the data may be examined for compression and/or de-duplication.

Figure 3:
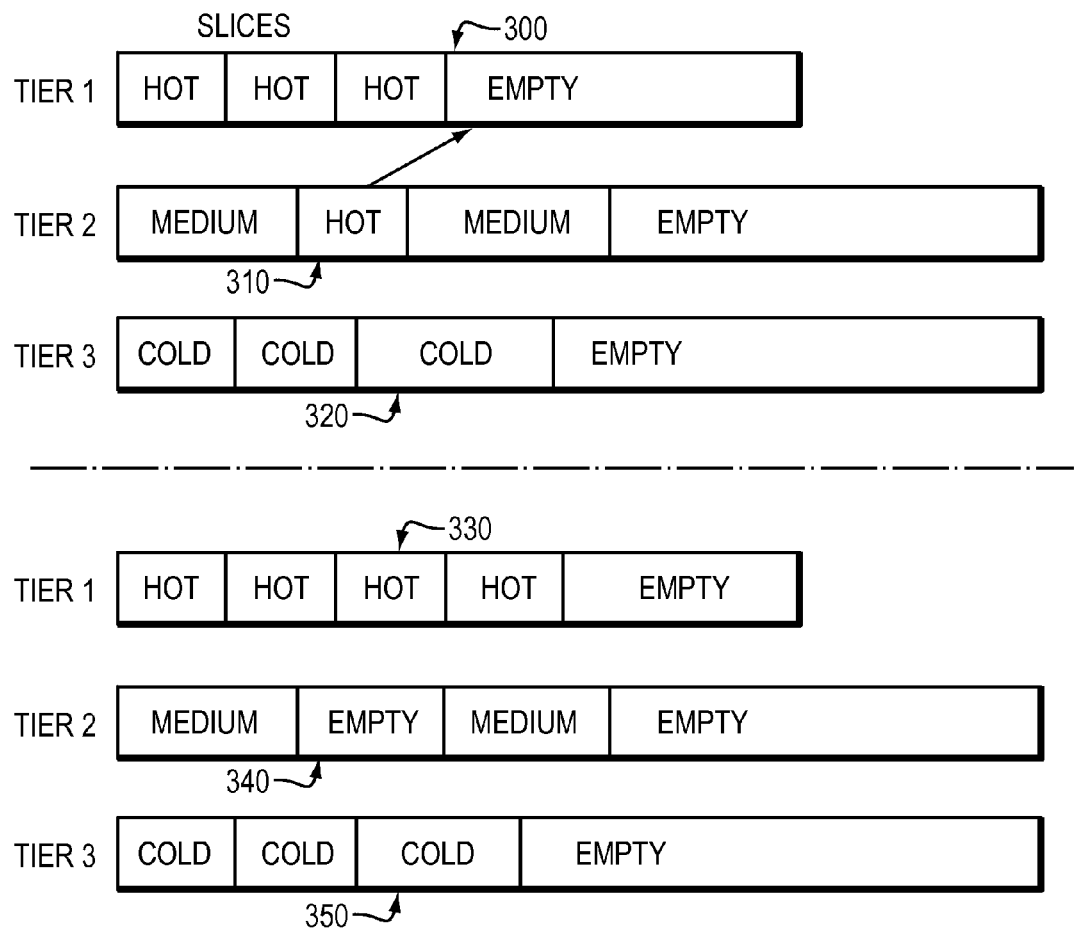
FIG. 3 is an embodiment of the current techniques.

Referring now to FIG. 3, shown is an example embodiment in accordance with the current technique. In this figure, there are three tiers, tier 1, tier 2 and tier 3. Each tier may be comprised of distinct storage devices or a group of similarly performing devices. For example, tier 1 may be comprised of SSDs, tier 2 may be comprised of FC disk devices, and tier 3 may be comprised of SATA devices. Spread across these tiers are slices, such as slices 300, 310, and 320. Each slice may have a temperature associated with it such as hot, cold, or medium, as determined by the tiering mechanism 28. For example, slices 310 and 330 are hot, and slices 320 and 350 are cold. As well, as illustrated by spaces 300 and 340 in FIG. 3, each tier may have empty space, which may be used to store slices migrated to the tier.

In this example embodiment, tier 1 may have faster performance characteristics and a higher cost. Conversely, tier 2 may have slower performance characteristics but a lower cost. This may be realized, for example, by observing the fact that there is more storage space in tier 2 than there is in tier 1.

Referring to the upper portion of FIG. 3, it is shown that there is a hot slice 310 in tier 2 that can be moved to empty space 300 of tier 1, as determined by tiering mechanism 28. This determination may be based on slice access statistics for slivers of the slice alone or in combination with cache access statistics associated with slivers of the slice managed by the cache. In this example embodiment, as shown in the lower portion of FIG. 3, the hot slice is moved into the empty space of tier 1 leaving empty space 340 in tier 2. Additionally, in this embodiment of the invention, the temperature of the slice and the time of the migration can be captured and saved with the slice. This is advantageous insofar as when a future decision is taken as regards moving the slice it is possible to determine the change in temperature and amount of time the slice has been in the tier. Slices whose temperature have decreased relative to when they are moved into the tier may be better candidates to move out of the tier. Slices which have only been in a tier for a short time may not be good candidates to move to a lower tier.

Figure 4:
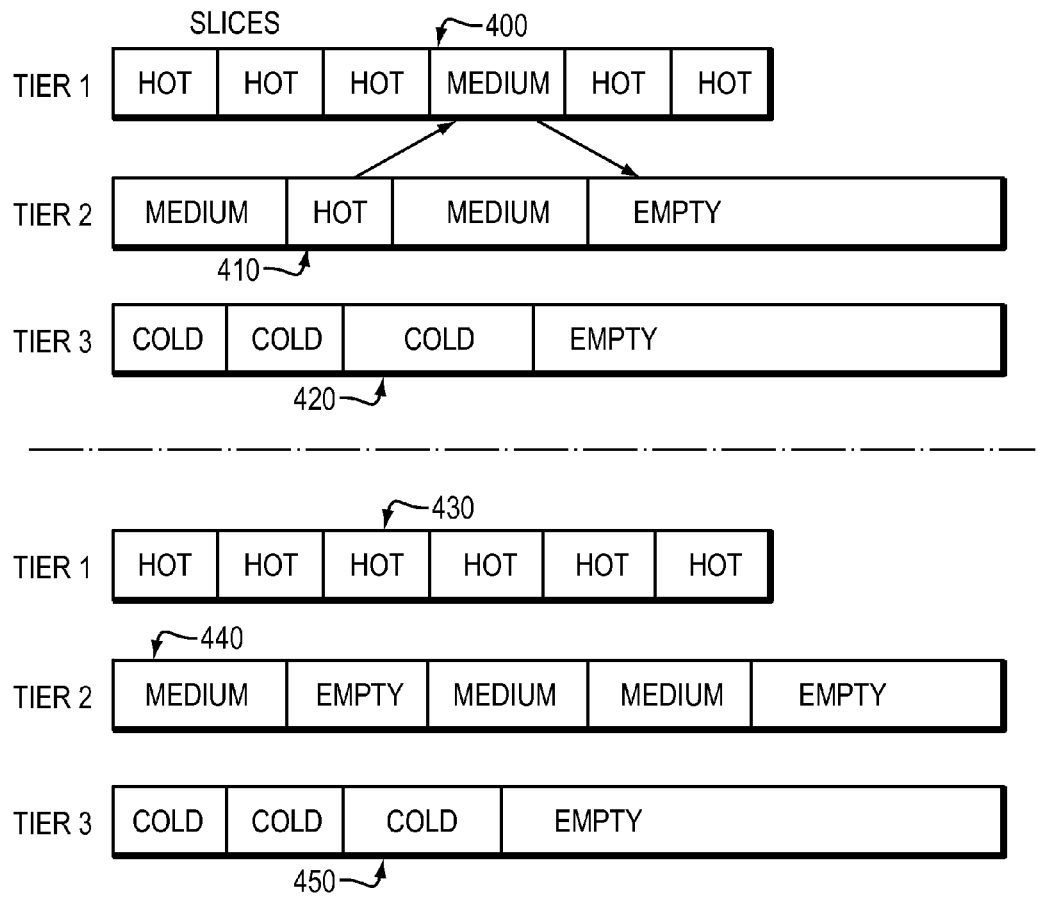
FIG. 4 is an alternative embodiment of the current techniques.

Referring now to FIG. 4, shown is another example embodiment in accordance with the current technique. In this embodiment, there is hot slice 410 in tier 2 and medium slice 400 in tier 1; however, tier 1 does not have empty space in which to accommodate an additional slice. Therefore, in this embodiment, the medium slice 400 on tier 1 is migrated to tier 2 and the hot slice 410 in tier 2 is migrated to tier 1. Note, that it is the need to migrate the hot slice 410 to tier 1 that caused the medium slice 400 to be shifted to tier 2. In some embodiments, tiering mechanism 28 may only migrate a slice if it is hotter than a slice in a higher tier. Also, in some embodiments, depending on the size of the slices to be migrated, the slices may swap tier locations; possibly with the use of temporary storage.

In some embodiments, the tiering mechanism 28 and/or cache 26 may be tuned to help provide improved system performance. As one example, the tiering mechanism 28 or cache 26 may be tuned to consider access statistics for slivers located in the "shadow" of cache 26, or in other words, slivers that are being considered for inclusion in cache 26. As another example, the tiering mechanism 28 may be tuned to consider cache access statistics for only the slices that are of a certain temperature. For example, tiering mechanism 28 may not consider cache access statistics for cold slices. In this example, the cache access statistics for slivers associated with respective hot slices of a group of hot slices may be considered in determining which one or more of the slices in the group should be migrated to a faster tier. In these examples and the embodiments described above, the weight given to specific access statistics may also be tuned. For instance, access statistics for slivers in the cache shadow may be given less weight than access statistics for slivers in cache 26. And, access statistics for slivers in cache 26 may be given less weight than access statistics for slivers that have not been cached. In another embodiment the tiering mechanism 28 may be tuned so that the temperature of cold slices in a data storage device is changed to a higher temperature based on high data activity associated with slivers in the cache. Additionally, the tiering mechanism may be tuned to migrate the slice to a higher tier based on the number of hot slivers in a slice. Slices with more hot slivers are better candidates for migration to a higher tier than a slice with a small number of hot slivers. In other words, there are multiple ways to tune the tiering mechanism 28 and cache 26. It should be noted that tuning can be performed automatically by the storage system or by a user.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing tiering in a cache-based system, wherein the cache-based system comprises a first data storage tier and a second data storage tier configured such that the performance characteristics associated with the second tier is superior to the performance characteristics associated with the first tier, further wherein the cache-based system comprises a cache separate to the first and second tiers, still further wherein a data group is stored on the first data storage tier and additionally comprises a number of data units associated with the data group that are stored in cache and the first data storage tier, the method comprising:
   collecting cache activity data in connection with the number of data units stored in the cache;
   collecting non-cache activity data in connection with the data group stored on the first data storage tier, wherein the data group stored on the first data storage tier comprises a plurality of data units including the number of data units that are stored in cache and the first data storage tier;

determining a temperature of the data group based on the cache activity data in combination with the non-cache activity data, wherein the cache activity data relates to activity in connection with the number of data units stored in the cache, further wherein the non-cache activity relates to activity in connection with the data group stored on the first data storage tier; and based on the determined temperature of the data group, the number of data units stored in cache that are associated with the data group and the performance characteristics associated with the second data storage tier, determining to migrate the data group from the first data storage tier to the second data storage tier.

2. The method as claimed in claim 1, wherein the first and second data storage tiers comprise at least one storage device.

3. The method as claimed in claim 1, wherein the first and second data storage tiers comprise a plurality of storage devices grouped together such that the storage devices in the respective tiers have similar performance characteristics.

4. The method as claimed in claim 1, wherein the data temperature of the data group is dependent on the amount of data activity in connection with the data group.

5. The method as claimed in claim 1, wherein the data temperature is an average of temperatures over a time period.

6. The method as claimed in claim 1, wherein the data temperature is dependent on the cache and non-cache activity data collected over a specific time period.

7. The method as claimed in claim 1, wherein the data temperature is associated with performance characteristics of a data storage tier.

8. The method as claimed in claim 7, wherein the decision to migrate the data group to the second data storage tier is dependent on the data temperature corresponding with the performance characteristics of the second data storage tier.

9. The method as claimed in claim 1, further comprising storing the data temperature for enabling future analysis of the data temperature.

10. A system for use in managing tiering in a cache-based system, wherein the cache-based system comprises a first data storage tier and a second data storage tier configured such that the performance characteristics associated with the second tier is superior to the performance characteristics associated with the first tier, further wherein the cache-based system comprises a cache separate to the first and second tiers, still further wherein a data group is stored on the first data storage tier and additionally comprises a number of data units associated with the data group that are stored in cache and the first data storage tier, the system comprising:

first logic collecting cache activity data in connection with the number of data units stored in the cache;

second logic collecting non-cache activity data in connection with the data group stored on the first data storage tier, wherein the data group stored on the first data storage tier comprises a plurality of data units including the number of data units that are stored in cache and the first data storage tier;

third logic determining a temperature of the data group based on the cache activity data in combination with the non-cache activity data, wherein the cache activity data relates to activity in connection with the number of data units stored in the cache, further wherein the non-cache activity relates to activity in connection with the data group stored on the first data storage tier; and based on the determined temperature of the data group, the number of data units stored in cache that are associated with the data group and the performance characteristics associated with the second data storage tier, fourth logic determining to migrate the data group from the first data storage tier to the second data storage tier.

11. The system as claimed in claim 10, wherein the first and second data storage tiers comprise at least one storage device.

12. The system as claimed in claim 10, wherein the first and second data storage tiers comprise a plurality of storage devices grouped together such that the storage devices in the respective tiers have similar performance characteristics.

13. The system as claimed in claim 10, wherein the data temperature of the data group is dependent on the amount of data activity in connection with the data group.

14. The system as claimed in claim 10, wherein the data temperature is an average of temperatures over a time period.

15. The system as claimed in claim 10, wherein the data temperature is dependent on the cache and non-cache activity data collected over a specific time period.

16. The system as claimed in claim 10, wherein the data temperature is associated with the performance characteristics of a data storage tier.

17. The system as claimed in claim 16, wherein the decision to migrate the data group to the second data storage tier is dependent on the data temperature corresponding with the performance characteristics of the second data storage tier.

18. The system as claimed in claim 10, further comprising fifth logic storing the data temperature for enabling future analysis of the data temperature.

* * * * *